Sept. 2, 1969　　　　　J. R. YOUNKIN　　　　　3,465,218
MULTIFUNCTION SYNCHRONOUS FILTER
Filed March 11, 1966　　　　　　　　　　　3 Sheets-Sheet 3

United States Patent Office 3,465,218
Patented Sept. 2, 1969

3,465,218
MULTIFUNCTION SYNCHRONOUS FILTER
James R. Younkin, Mineral Wells, Tex., assignor to Mitchell Industries, Inc., Mineral Wells, Tex., a corporation of Texas
Filed Mar. 11, 1966, Ser. No. 533,698
Int. Cl. G05b 23/02, 11/01
U.S. Cl. 318—18                              8 Claims

ABSTRACT OF THE DISCLOSURE

The invention disclosed is a system for controlling elements of an aircraft or the like in accordance with various signals derived from a number of sensors. A first synchronous filter is connected at its input to the structure which controls the actuation of the elements. A square wave reference voltage source is connected to control the synchronous filter. The A.C. output signal from a second synchronous filter is synchronized by the square wave reference voltage and is applied to a summation circuit for summing with a sensor signal. The summed signal is then applied to the input of the first synchronous filter. The output of the first synchronous filter is converted to a D.C. signal and delayed in a feedback signal loop leading to the input of the first synchronous filter.

---

This invention relates to the treatment of control signals and more particularly to synchronously filtering a control signal while performing at least one other operation on the control signal.

In control systems such as autopilots for aircraft and the like, it has been the practice to combine various signals derived from a plurality of sensors in such a way as to produce a desired control action within or upon a given aircraft. The signals heretofore employed have been controlled and treated primarily in a D.C. state. It has been found, however, that in accordance with the present invention, alternating current signals may be combined and employed reliably in control operations. Thus, the present invention permits simplification of signal handling in control systems by the use of a synchronous filter. Addition or combining of a plurality of alternating current signals is accomplished where the summing action is followed by synchronous filtering. Further, it permits the addition of D.C. signals to A.C. signals while limiting and chopping the sum to place the resultant signal in condition for use in effecting a control action.

In accordance with the present invention, a synchronous filter is provided having voltage output terminals. An A.C. signal source and a resistor are connected in series with the output terminals. A pair of capacitors each are connected in series and at the common point to the resistor, and to a first of the output terminals. Two switching transistors separately couple the second terminals of the capacitors through the collector-emitter path to the second of the output terminals. Means are provided for applying a square wave voltage synchronized with the A.C. signal to the bases of the transistors for alternately rendering them conductive. Means are provided for independently controlling the magnitude of the square wave voltage applied to the transistors to control the limiting action of each of the transistors when in the non-conducting state independently to limit the in-phase and the out-of-phase components of the signal.

For a more complete understanding of the present invention and for further objects and advantages thereof, reference may now be had to the following description taken in conjunction with the accompanying drawings in which.

Figure 1:
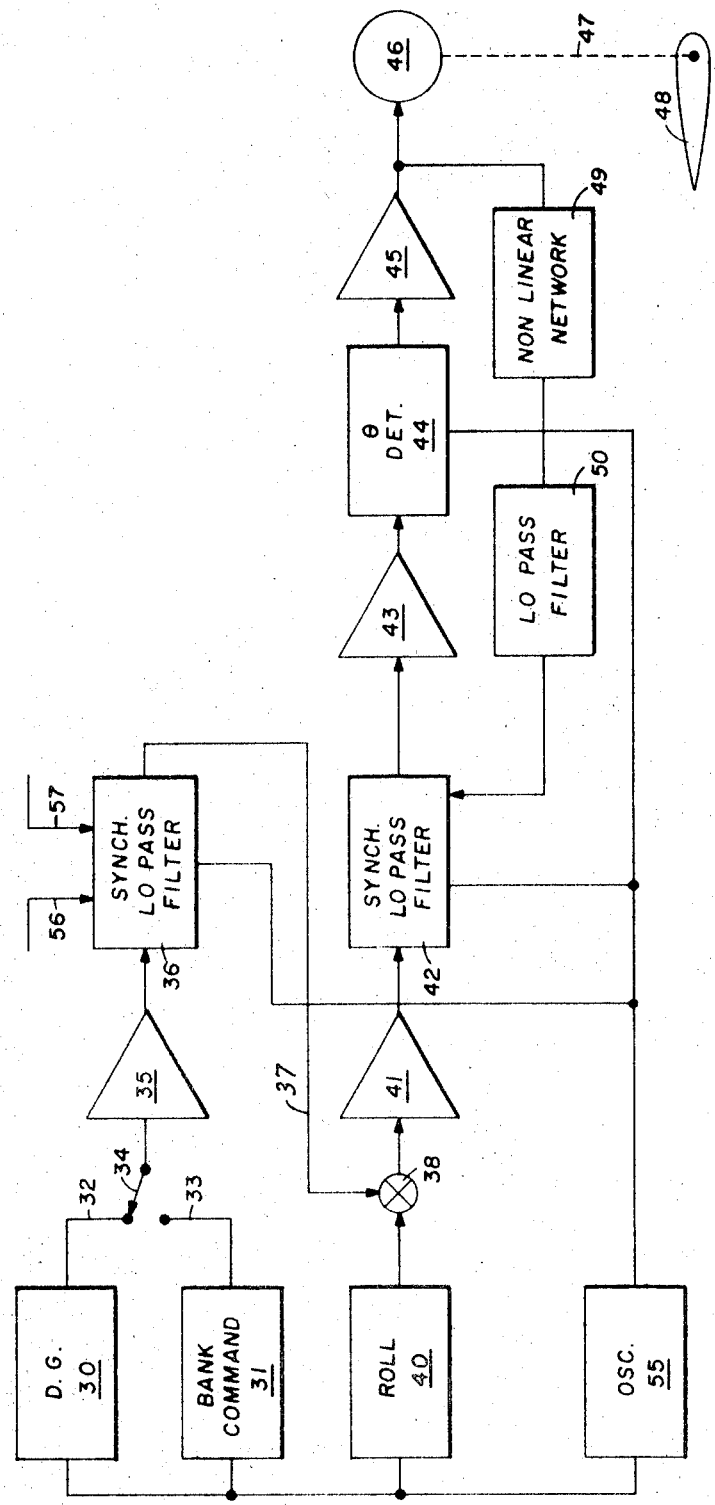
FIGURE 1 is a diagram of an autopilot system which includes two synchronous low-pass filters.

In FIGURE 1, a flight control system embodying the present invention is illustrated in simplified block form. The system lacks the usual follow-up elements while simulating the function thereof in an amplifier drive for the servo system.

A directional gyro 30 and a bank command unit 31 are connected by way of channels 32 and 33, respectively, and a selector switch 34 to an A.C. amplifier 35 and thence to a synchronous low-pass filter 36. The output of the filter 36 is applied by way of channel 37 to a summing unit 38. A roll attitude gyro 40 is connected to the summing unit 38 so that the combined output signals from unit 38 are applied to an amplifier 41 which drives a synchronous low-pass filter 42. The output of the filter 42 is applied to an A.C. amplifier 43 which drives a phase detector 44. The output of the phase detector is applied to a power amplifier 45 which in turn drives the servo unit 46. The servo unit is coupled by linkage 47 to a control surface such as aileron 48. The output of the amplifier 45 is applied by way of a non-linear network and a low-pass filter 50 to synchronous low-pass filter 42. A low frequency oscillator 55 is connected to units 30, 31, 36, 40, 42, and 44 for excitation and reference purposes, as will be explained hereinafter. The phase detector 44 and the power amplifier 45 are employed to produce D.C. output voltages of either polarity so that the servo 46 may be driven either of two directions.

It will be noted that the filter 36 is provided with two input excitation channels 56 and 57. The input drive voltages on channels 56 and 57 are variable, to provide for signal limiting action independently, to adjust the maximum right bank and left bank at which the control system will fly the aircraft, as will hereinafter be explained.

A synchronous filter 42 serves to eliminate unwanted signal components that may be picekd up in the circuit leading to the low-pass filter. By means of the input signal applied by channels 56 and 57, a limiting action is imposed on the magnitude of the signal that may be applied to the amplifier 41.

The synchronous low-pass filer 42 permits the addition of the DG signal from the filter 36 and the roll signal from the roll gyro 40 and, more specifically, provides for elimination of all but the wanted components of the signals. This is accomplished by applying the same reference signal, by way of channels 55a and 55b, to the synchronous filters 36 and 42 and to the gyros 30 and 40. In the low-pass filter 42, the D.C. feedback signal from filter 50 is added to the signal from amplifier 41 and is chopped and filtered to provide the proper control signal for the amplifier 43.

Figure 2:
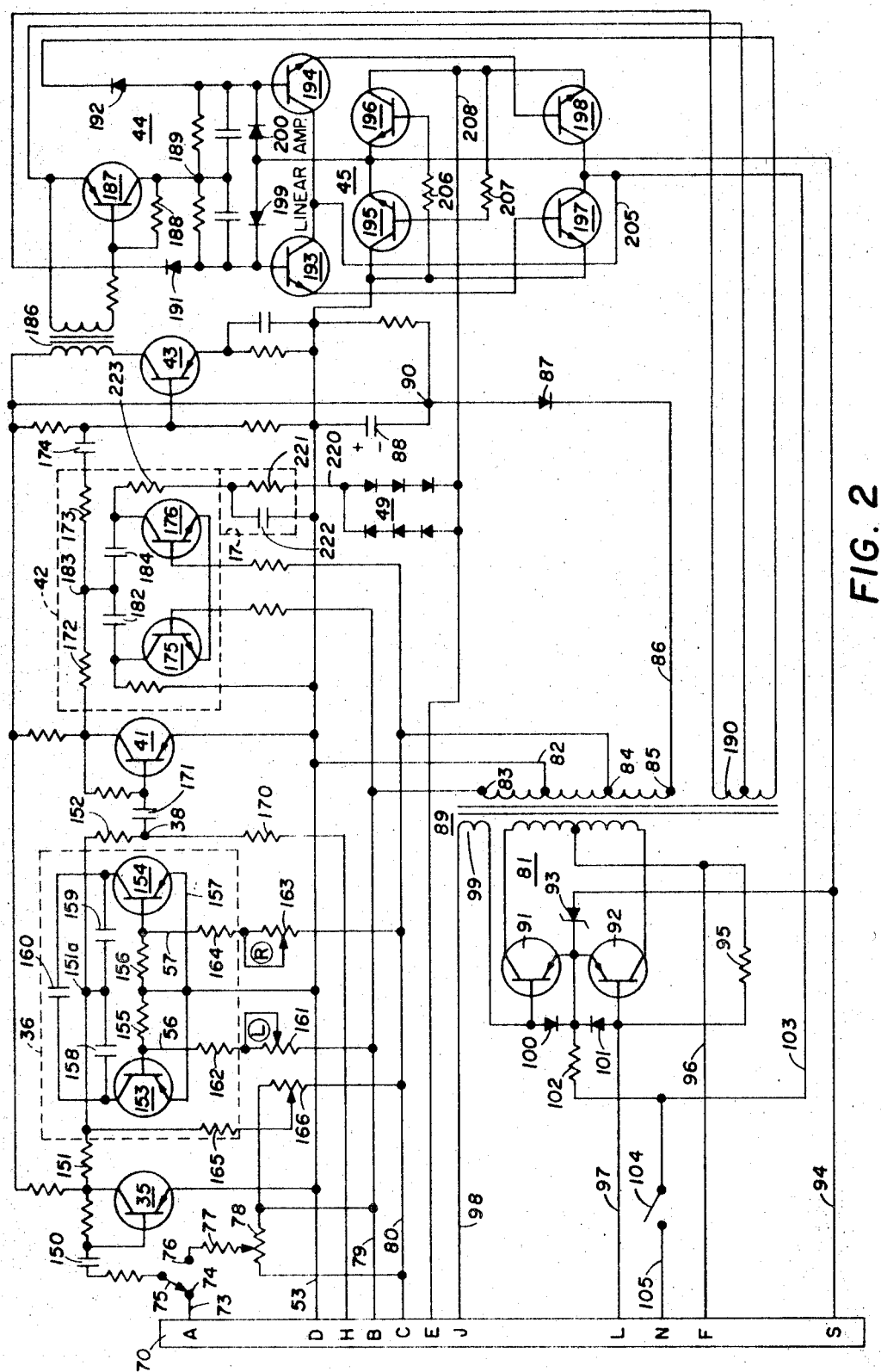
FIGURE 2 is a detailed circuit diagram of the system of FIGURE 1.
Figure 3:
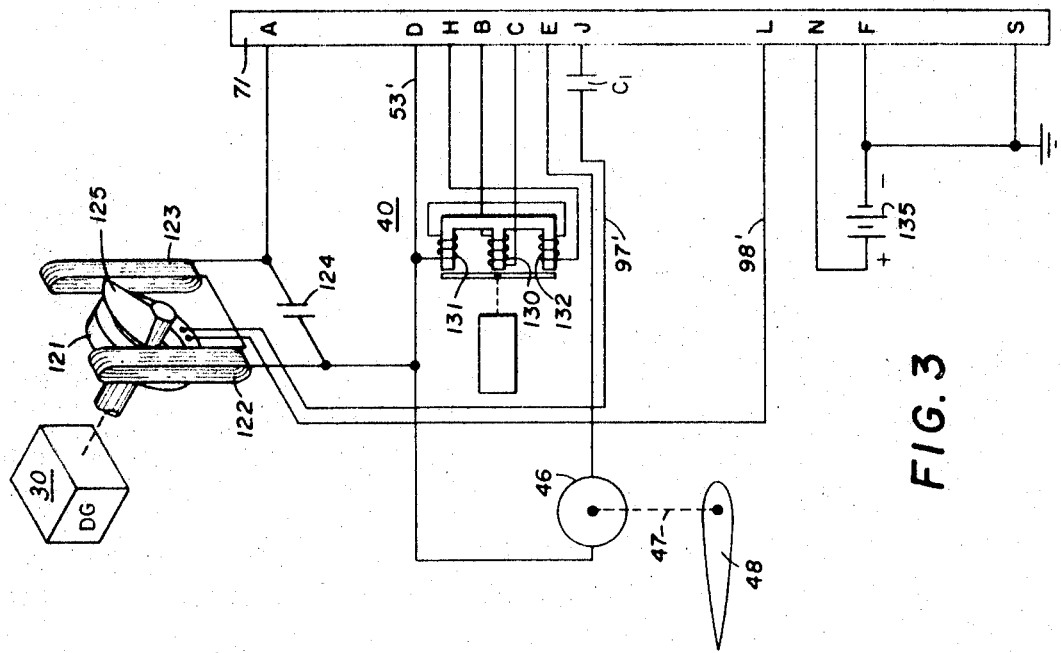
FIGURE 3 is a circuit showing the elements to be coupled to the circuit of FIGURE 2.

The system of FIGURE 1 is more completely illustrated in the detailed circuit diagram of FIGURES 2 and 3. The circuits of FIGURES 2 and 3 are coupled together by way of a terminal strip 70 which, for convenience, has terminals labeled alphabetically.

Terminal D in each case is connected to the common bus 53. Terminal A supplies a signal from directional gyro 30 by way of line 73 leading to switch terminal 74 of switch 75. Switch 75 serves to connect the amplifier input channel either to terminal 74 or to terminal 76, which is connected by way of resistors 77 to a potentiometer 78. The potentiometer 78 is the manually controlled element of the bank control unit 31 of FIGURE 1. The potentiometer 78 is connected between conductors 79 and 80 which in turn are connected to output transformer 89 of an oscillator 81. A secondary center tap 82 on the transformer 89 is connected to the common bus 53. Upper terminal 83 is connected to conductor 79 and lower terminal 84 is connected to conductor 80. Bottom terminal 85 of transformer 89 is connected by way of conductor 86 to a diode 87 to develop a D.C. voltage across condenser 88. Terminal 90 thus serves as the B— terminal of the power supply and the common bus 53 serves as the B+ terminal.

The oscillator 81 includes a pair of PNP transistors 91 and 92 having a common emitter circuit which is connected by way of a Zener diode 93 to a ground bus 94 which leads from terminal S on the strip 70. The collector of transistor 91 is connected to one extremity of the primary winding of transformer 89 and the collector of transistor 92 is connected to the other extremity. The center tap of the primary winding of transformer 89 is connected by way of resistor 95 to the base of transistor 92 and, by way of conductor 96, to terminal F on strip 70. Terminal F is connected to the ground terminal S in FIGURE 3. The ground circuit is completed only in FIGURE 3 in order to provide protection for the transistors in oscillator 81. The base of transistor 92 is connected by way of conductor 97 to terminal L. Terminal J is connected by way of conductor 98 and a third winding 99 to the base of the transistor 91. Oppositely poled diodes 100 and 101 serve to connect the bases of transistors 91 and 92 to the common emitter terminal. Resistor 102 connects the common emitter terminal to switch 104 which is connected by way of line 105 to the positive D.C. source input terminal N. The negative source terminal is connected to the ground bus 94 in FIGURE 3.

The terminal board 71 mates with the terminal board 70. The directional gyro 30 has a coil assembly, the primary winding 121 of which is excited by way of conductors 97' and 98' leading from the oscillator 81 through capacitor $C_1$. The secondary comprising coils 122 and 123 are connected in series opposition, with one terminal being connected to the common bus 53 and the other terminal being connected to the terminal A. A condenser 124 is across windings 122 and 123.

The roll gyro unit 40 is provided with an E-pick-off, with excitation coil 130 being connected by way of terminals B and C from the secondary winding of transformer 89 as applied to conductor 79 and 80. Coils 131 and 132 are connected in series opposition, with one terminal of the series circuit being connected to the common conductor 53' and the other terminal being connected to the terminal H.

The voltage applied to the servo actuator 46 is the voltage between terminals E and D. A D.C. source such as battery 135 is connected between terminals N and F.

The signal channel leading from the directional gyro 30 by way of switch 75, includes the amplifier 35 which is a single stage transistor amplifier. The signal is applied to the base of the transistor by way of condenser 150. The amplifier is a linear amplifier which becomes saturated when there is about a 20° error in the heading as sensed by the directional gyro 30.

The output of amplifier 35 is applied by way of synchronous filter 36 to the summation point 39 by way of resistors 151 and 152. The synchronous filter 36 includes transistors 153 and 154, the bases of which are connected together by way of resistors 155 and 156. The emitters are connected together and to common bus 53 by way of line 157. The collectors are connected together by way of condensers 158 and 159, the common juncture between condensers 158 and 159 being connected to the juncture between resistors 151 and 152. A condenser 160 is connected directly across the collectors of transistors 153 and 154.

A square wave A.C. voltage from transformer 89, appearing on conductors 79 and 80, is applied to the synchronous filter 36. More particularly, the conductor 79 is connected to the base of transistor 153 by way of potentiometer 151 and resistor 162. The line 80 is connected to the base of transistor 154 by way of potentiometer 163 and resistor 164. A resistor 165 is connected to the arm of a potentiometer 166, one extremity of which is connected to conductor 80 and the other terminal of which is connected to conductor 79.

The synchronous filter 36 provides voltage limiting such that "in" or "out" of phase signals may be limited independently at different amplitude levels. In the lateral guidance autopilot shown, this action is used for separate left and right bank adjustments. It will be understood, however, that because of its character as a limiter, such a synchronous filter is suited to many applications.

Figure 4:
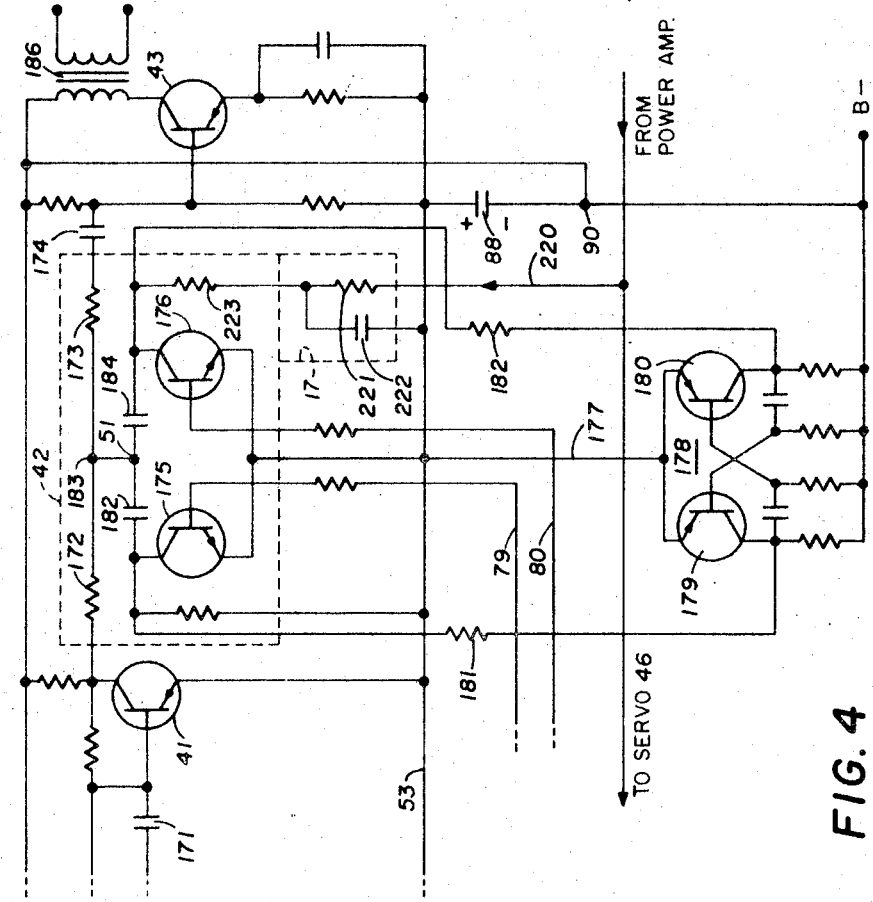
FIGURE 4 illustrates a modification of the synchronous filter 42 of FIGURE 2.

As shown in FIGURE 4, limiting action occurs when, in the "off" condition, a transistor collector voltage tends to exceed the reverse voltage applied to its base. While PNP transistors have been shown, NPN transistors will behave the same way when all voltage polarities are reversed.

If the signal on the base of transistor 153 is negative during the "off" half cycle, the transistor 153 will not conduct in response to a signal at terminal 151a. If the signal is positive, conduction will occur when the collector becomes more positive than the base. The collector-base junction and emitter-base junction of the transistor 153 may be viewed as separate diodes.

The synchronous filter 36 employs drive voltages to transistors 153 and 154 which may be adjusted independently. When the signal is positive, transistor 153 or transistor 154 will limit when the input is of "0°" phase, while the other transistor will limit when the signal is of "180°" phase. During the half cycle when the input is positive, transistor 153 is non-conducting and transistor 154 is conducting. The reverse voltage at the collector of transistor 153 is the sum of voltages stored in the two capacitors 158 and 159. This voltage is the average of usable signal voltage during the half cycle, as would be noted by traversing the closed loop consisting of transistors 153 and 154 and capacitors 158 and 159. When this voltage is greater than the drive voltage which is applied to the base of transistor 153, transistor 153 conducts and the combined voltages on the capacitors 158 and 159 are thus limited. The level at which limiting occurs can be adjusted by varying resistors 162 and 164. Should the phase of the input signal relative to that of switch excitation be reversed, transistor 154 will become the limiter.

Thus, the adjustable potentiometers 161 and 163 permit compensation for imperfections in sensing the horizon. The potentiometer 166 provides for compensation for centering error. The time constant of the circuit of condenser 160 is about three seconds. In contrast, the time constant of the circuit involving condensers 158 and 159 is much smaller, the ratio between the time constants being about 1 to 5,000. Small capacitors 158 and 159 couple the signal into the circuit. The resultant D.C. voltage from the square wave input signal will appear between the collector terminals of transistors 153 and 154. The large condenser 160 prevents rapid response of the circuit to changes in the input signal. The filter circuit 36 thus serves to limit the output signal as to prevent an excessive maneuver of the aircraft. Further, it introduces a lag or delay in the system response. Finally, it serves to eliminate from the signal any unwanted components that may have been picked up in the various signal channels leading to the input of the filter. The filter thus permits the summation of the A.C. signals without difficulties generally attendant such procedures where unwanted components may render the system inoperative.

The excitation current for the directional gyro 30 is derived from oscillator winding 99. The winding 121 on the directional gyro, toghether with condenser $C_1$ and coil 89, forms a low impedance series resonant circuit of high Q.

Thus, the current in the excitation winding 121 is in phase with the square wave voltage in the winding 99. The directional gyro pick-up coupling essentially is an air coupling so that the voltages in the pick-up coils 122 and 123 are in phase with the square wave voltage from the secondary winding of the output transformer 81. Since the voltages are in phase, the application of such voltages to the filter 36, as at point 151a and by way of conductors 56 and 57, permits the synchronous filter operation to be carried out. With such a filter, it has been found that mixing of A.C. signals, followed by synchronous filtering, greatly enhances the system operation, eliminating unwanted components from the signal channel. It permits mixing of A.C. amplitude-dependent signals not heretofore attempted in control systems of the present type.

Thus, an attitude command signal is applied to the summation point 38 by way of resistor 152. A bank-angle signal is applied to the summation point from terminal H by way of resistor 170. The resultant summation signal is then applied by way of coupling condenser 171 to the amplifier 41. The output of amplifier 41 is applied to a second synchronous filter 42 which includes resistor 172, leading from the collector of the transistor in amplifier 41, and resistor 173 which is connected by way of condenser 174 to the base of the transistor in amplifier 43.

The synchronous filter 42 includes transistors 175 and 176. The bases of the transistors are driven from transformer 89 by way of the buses 79 and 80. The common emitter circuit of transistors 175 and 176 is connected to the common bus 53 by way of conductor 177. Capacitor 182 connects the collector of transistor 175 to terminal 183 at the juncture between resistors 172 and 173. Similarly, a condenser 184 connects the collector of transistor 176 to terminal 183. The input coupling to filter 42 provides rapid response rather than a delay as built into filter 36 by condenser 160.

The signal from the amplifier 43 is applied by way of transformer 186 to transistor 187. The transformer 186 provides for D.C. isolation of the phase detector 44. The amplifier 43 provides an increase both in gain and power of the signal which drives the phase detector. A resistor 188 provides a forward bias on transistor 187 so that the transistor 187 will conduct when there is no signal present.

The phase detector 44 thus provides the input error signal which is applied to the terminal 189. Reference signals, derived from the winding 190 on transformer 189, are applied to the phase detector by way of diodes 191 and 192. The reference signals are applied to the bases of transistors 193 and 194 which are the driver transistors for the power amplifier 45.

Power amplifier 45 includes transistors 195, 196, 197, and 198. The common emitter terminal on transistors 195 and 196 is connected to the ground bus 94 and to the common juncture between diodes 199 and 200 which lead to the bases of transistors 193 and 194, respectively. The common collector terminal of transistors 193 and 194 is connected by way of conductor 205 to the common collector terminal of transistors 197 and 198, and, by way of conductor 103, to the positive terminal of battery 135, FIGURE 3. The emitter of transistor 193 is connected to the base of transistor 197 and the emitter of transistor 194 is connected to the base of transistor 198. The base of transistor 195 is connected to the base of transistor 196 by way of resistor 206 and, by way of resistor 207, to the emitter of transistor 198. The emitter of transistor 198 is connected by way of conductor 208 to terminal E of strip 70 which leads to the servo 46, FIGURE 3. By this means, the amplifier output signal appearing on conductor 208 is applied to the servo 46. The amplifier 45 and driver amplifiers 193 and 194 are linear up to a given level above which they become saturated.

In accordance with the present invention, a feedback signal is applied by way of conductor 220, non-linear network 49, and filter 17 comprising resistor 221, condenser 222, and resistor 223, to the collector of transistor 176 in synchronous filter 42. The non-linear network comprised of one or more pairs of oppositely poled diodes serves to compensate for the voltage necessary to overcome static friction in the servo actuator 46. Thus, there will be no voltage in the feedback circuit until the output signal appplied to the actuator 46 is of a level equal to the motor threshold voltage. In the system described, the non-linear network 49 includes six diodes, three connected effectively in series in each direction. The feedback loop encompasses the saturable amplifiers 193, 194 and 45. No feedback signal is introduced into the synchronous filter 42 until the power amplifier output voltage is adequate to begin to move actuator 46. By use of a time delay feedback network around the saturable amplifiers, the transfer characteristic of the system is altered so that the servo unit will be actuated properly to control the attitude of the aircraft.

The time constant of the feedback filter 17 is controlled as to form a lag network, which, with network 49, matches the signal in the drive amplifier to the servo 46. The characteristics of the unbalance signal are thus matched to the servo so that movement of the control surface 48 will be properly controlled without the necessity of a follow-up element coupled thereto.

In one embodiment of the invention, the square wave generator 81 had an output at 5,000 cycles per second. The voltages induced into windings 122 and 123 are equal when the coupling thereto controlled by the position of rotor 120 is symmetrical so that there is zero output. Any unbalance produces an error signal which appears at terminal A for application to the amplifier 35 as a sinusoidal voltage.

As earlier mentioned, the problem present by reason of static friction in the servo actuator 46 can be treated other than by the non-linear network 49. More particularly, in FIGURE 4, the synchronous filter 42 utilizes a signal from a dither oscillator 178 to effectively keep the actuator 46 constantly moving, thereby avoiding static friction.

As shown in FIGURE 4, the dither oscillator 178 has been added to the circuit in place of the non-linear network 49 of FIGURE 2. The dither oscillator includes transistors 179 and 180. The common collector terminal is connected to the common bus 53. The collector terminal of transistor 179 is connected to the collector terminal of filter transistor 175 by way of resistor 181. The collector transistor 180 is connected to the collector transistor 176 by way of resistor 182. The circuit of FIGURE 4 will be recognized as including only a portion of the circuit of FIGURE 2, and, more particularly, the circuit involving the synchronous filter 42. It illustrates the manner in which the synchronous filter utilizes a dither oscillator signal.

It will be recognized that the system of FIGURES 2 and 3 will be preferred over the system of FIGURE 4 since the latter requires the servo actuator to be continuously energized and thus involves expenditure of energy not required in the system of FIGURES 2 and 3. It also avoids undesired overheating of the actuator but nevertheless has been found to operate satisfactorily.

The lateral guidance system described above has been described and claimed in applicant's copending application Ser. No. 533,708, filed Mar. 11, 1966.

In an embodiment of the present invention as shown in FIGURES 2 and 3, the following parameters were employed:

| | |
|---|---|
| Oscillator 81 | 5000 c.p.s. |
| Transistors 153, 154, 187 | MA900. |
| 175, 176, 193, 194 | 2N3116. |
| 91, 92 | 2N1194. |
| 195–198 | 2N3005. |
| 35, 41, 43 | MPS6515. |

| | |
|---|---|
| Resistors 155, 156 | 2.7K. |
| 151, 162, 164 | 4.7K. |
| 161, 163, 166 | 20K. |
| 165 | 150K. |
| 152 | 10K, 12K, 15K, 18K or 20K (depending upon bank range desired). |
| Condensers 158, 159 | 1 microfarad. |
| 222 | 500 microfarads. |
| 160 | 50 microfarads. |
| Resistors 170 | 10K. |
| 223 | 3.3K. |
| 221 | 4.7K. |
| Diodes 49 | IN4001. |

Having described the invention in connection with certain specific embodiments thereof, it is to be understood that further modifications may now suggest themselves to those skilled in the art and it is intended to cover such modifications as fall within the scope of the appended claims.

What is claimed is:

1. In a control system having actuating means responsive to an output signal for effecting a control function, the combination which comprises:
    (a) a synchronous filter coupled at its output to said actuating means,
    (b) a square wave reference voltage source for control of said filter,
    (c) a pair of source means each generating an electrical signal, at least one of said means being connected to said reference voltage source for producing an A.C. electrical signal synchronized with said square wave voltage, and
    (d) summation means connected to said pair of signal sources for combining the output signals of said sources into a summation signal and for applying the summation signal to said synchronous filter.

2. The combination set forth in claim 1 in which said actuating means is a servo actuator responsive to the output signal from said filter and in which means are provided for converting said output signal to D.C. and delaying the same in a feedback signal loop leading to the input to said synchronous filter.

3. The combination set forth in claim 1 in which signal coupling capacitors small in value are connected in series across said synchronous filter.

4. The combination set forth in claim 2 in which a low frequency dither signal is applied to said synchronous filter to maintain said actuator free from static friction for response to low level states of said summation signal.

5. A synchronous filter which comprises:
    (a) a pair of transistors resistively coupled at their bases, with emitters thereof directly connected together, and collectors thereof interconnected by way of a first branch having a pair of condensers and a second branch having a single condenser,
    (b) a monofrequency signal source connected at one output terminal to the juncture between said two condensers and to an output terminal of said transistors, and at a second output terminal to said emitters, and
    (c) control means for applying substantially independently to the bases of said transistors a monofrequency signal synchronized with the signal from said source for independent control of the conductivity of a signal from said signal source in said transistors.

6. The combination set forth in claim 5 in which said control means includes means for independently adjusting the magnitudes of the voltages applied to said bases.

7. The combination set forth in claim 5 in which the condensers of said pair are of like value and are much smaller than the capacitance of said single condenser to provide a delay in passage of signals from said source to said output terminal.

8. The combination set forth in claim 5 in which means are provided for applying and maintaining a reverse bias on said transistors.

References Cited

UNITED STATES PATENTS

| | | | |
|---|---|---|---|
| 3,241,016 | 3/1966 | Wattson | 318—18 |
| 3,246,221 | 4/1966 | Rabier | 318—28 |
| 3,248,559 | 4/1966 | Azar | 318—18 XR |

BENJAMIN DOBECK, Primary Examiner

U.S. Cl. X.R.

318—28, 30